(12) United States Patent
Peng et al.

(10) Patent No.: US 7,292,352 B2
(45) Date of Patent: Nov. 6, 2007

(54) LASER INDEX DEVICE ON TOOL SHAFT OF MACHINE

(76) Inventors: Hsin Fung Peng, No. 7, Lane 2, JhongJheng Rd., Sanyi Township, Miaoli County 367 (TW); Sen-Lu Peng, No. 7, Lane 2, JhongJheng Rd., Sanyi Township, Miaoli County 367 (TW)

( * ) Notice: Subject to any disclaimer, the term of this patent is extended or adjusted under 35 U.S.C. 154(b) by 319 days.

(21) Appl. No.: 11/173,424

(22) Filed: Jul. 1, 2005

(65) Prior Publication Data

US 2007/0002335 A1    Jan. 4, 2007

(51) Int. Cl.
*G01B 11/14*    (2006.01)
(52) U.S. Cl. .................. 356/614; 219/121.78
(58) Field of Classification Search ........ 356/614–623; 219/121.74, 121.78, 121.67, 121.8
See application file for complete search history.

(56) References Cited

U.S. PATENT DOCUMENTS

| | | | | |
|---|---|---|---|---|
| 4,585,379 A | * | 4/1986 | Nagayama et al. | 409/147 |
| 5,376,061 A | * | 12/1994 | Suzuki | 483/13 |

FOREIGN PATENT DOCUMENTS

| | | | | |
|---|---|---|---|---|
| JP | 359102556 A | * | 6/1984 | |
| JP | 11114741 A | * | 4/1999 | |

* cited by examiner

*Primary Examiner*—Hoa Q. Pham
(74) *Attorney, Agent, or Firm*—Charles E. Baxley

(57) ABSTRACT

A laser index device is connected to a main shaft of machine and includes a lens unit for generating a laser beam which is refracted via a prism to produce a laser mark on the product so as to guide the user to move an inspection device to inspect the produce. An image processing device is located above the lens unit and display the image on a display device. A machining display unit displays movement of tool to machine the product.

6 Claims, 4 Drawing Sheets

LASER INDEX DEVICE ON TOOL SHAFT OF MACHINE

FIELD OF THE INVENTION

The present invention relates to a laser index device on a tool shaft of machine so as to emit a laser beam on product to quickly guide the user to measure the product.

BACKGROUND OF THE INVENTION

In order to ensure products are made to meet desired specification, inspection plays an important role during process of manufacturing. The users need to check the semi-product in each step to ensure that all the requirements are met. However, most of the machine does not have inspection devices attached thereto so that the semi-products have to be removed from the machine and sent to the inspection device to check. This is a time-consuming process and once the semi-products are put back to the machine, all the basic data and check points have to re-set again. Although modern machine controlled by computer is developed and is able to precisely machine products, inspection is still a problem for precise products. Besides, a precise inspection device generally magnifies the product by hundreds of times so as to check a minor flaw of the products, the users usually have to shift the product several times to move the desired detection area under the magnifying unit of the inspection device. This is an inherent shortcoming for the conventional inspection device.

The present invention intends to provide a laser index device which marks a laser spot on the desired area to be inspected so that the users can easily move the area to inspect or measure it.

SUMMARY OF THE INVENTION

The present invention relates to a laser index device that comprises an inspection device connected to a main shaft of machine. A lens unit is connected to the inspection device and an image processing device is located above the lens unit so as to send the image to a display device. A positioning device has a fixing ring received therein and a laser assembly is connected to the fixing ring. A switch is connected to an outside of the positioning device for activating the laser unit which emits a laser beam on a product.

The primary object of the present invention is to provide a laser index device that marks the desired area of the product by a laser spot so that the user is able to obtain the distance to the desired area and send the image of the area on the display device for convenience of measurement.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
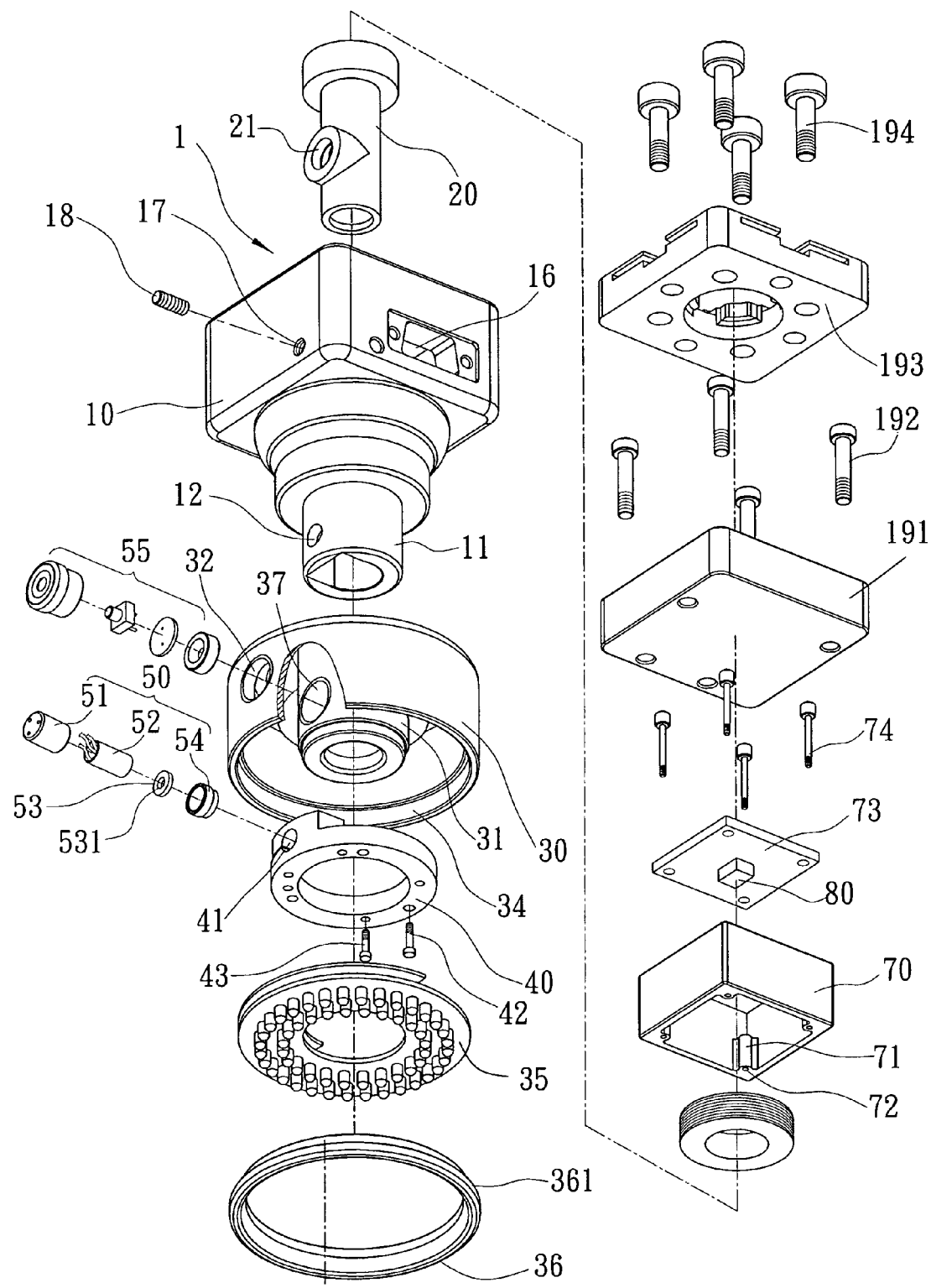
FIG. 1 is an exploded view to show the laser index device of the present invention.
Figure 2:
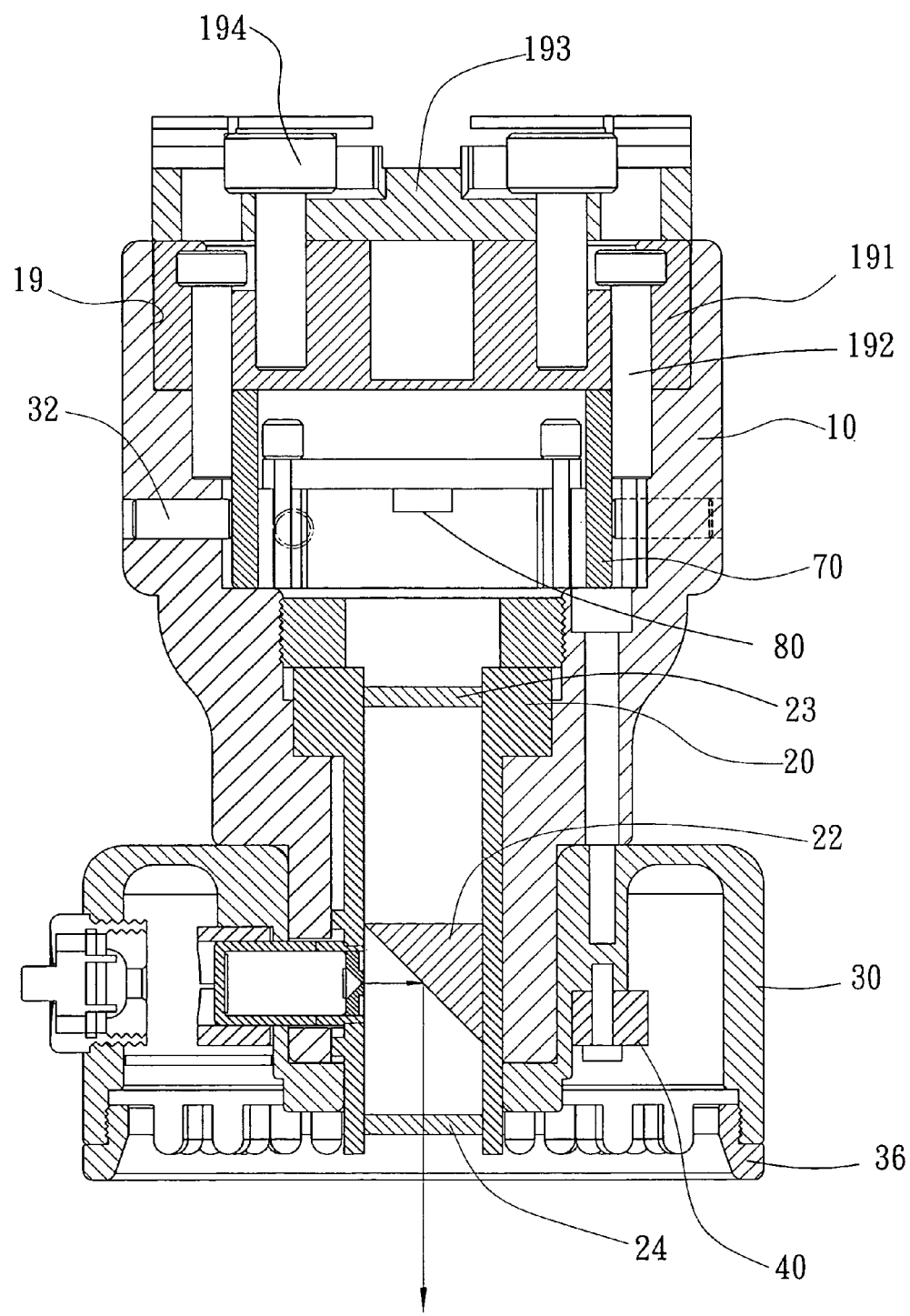
FIG. 2 is a cross sectional view to show the laser index device of the present invention.
Figure 3:
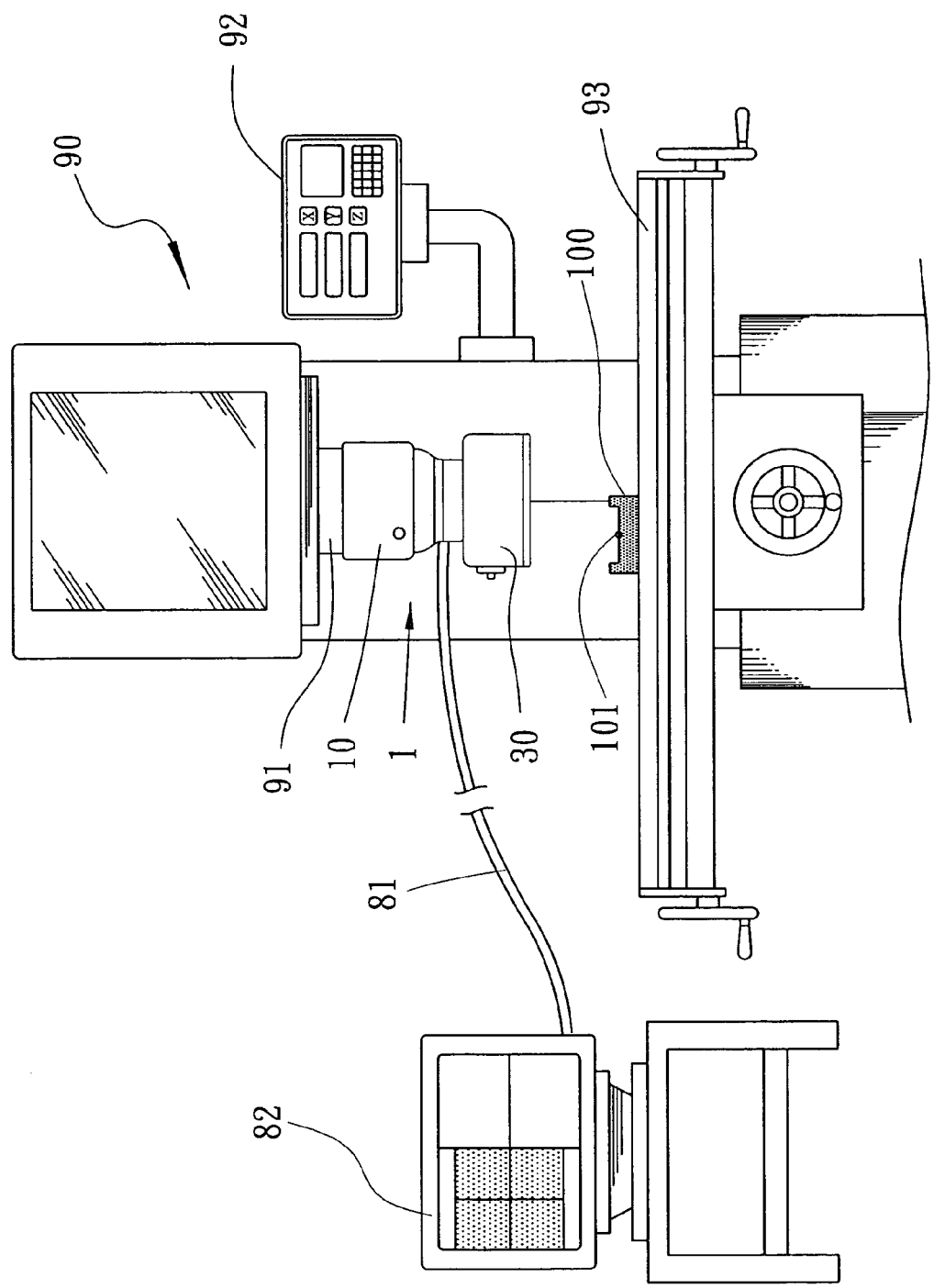
FIG. 3 shows that the laser index device of the present invention is connected to the main shaft and marks the product.

Referring to FIGS. 1 to 3, the laser index device 1 of the present invention comprises an inspection device 10 which includes a rectangle portion and a lens unit 20 is installed in the rectangle portion from a top thereof. A connection neck 11 extends from an underside of the rectangle portion and includes a side hole 12 defined radially therethrough. A positioning device 30 has a fixing ring 40 mounted to a tubular protrusion 31 extending from an inside thereof and a laser assembly 50 is inserted in a hole 41 defined through the fixing ring 40 and a receiving hole 21 defined radially through a wall of the lens unit 20, A prism 22 is received in the lens unit 20 so that a laser beam generated from the laser assembly 50 is refracted by the prism 22 toward the product on the working bench. The laser assembly 50 includes an isolation sleeve 51 in which a laser generating member 52 is received, and a control collar 53 which has a center hole 531 so that the size of the laser beam generated from the laser generating member 52 is restricted.

A switch 55 is received in a installed hole 32 defined through the outside of the positioning device 30 and another hole 37 defined in the tubular protrusion 31 so that when the user pushes the switch 55, the laser unit 20 is activated to emits a laser beam on a product 100 on a working bench.

A fixing bolt 42 and an adjusting bolt 43 extend through the fixing ring 40 so as to adjust the fixing ring 40 and the orientation of the laser assembly 50. An LCD assembly 35 is connected to an underside of the fixing ring 40 and a positioning ring 36 is connected to the positioning device 30 to position the LCD assembly 35 by engaging the outer threaded periphery 361 of the positioning ring 36 with the inner threaded periphery 34 of the positioning device 30.

An image processing device 73 is located above the lens unit 20 and received in a frame 70 which is received in the positioning device 30. The frame 70 includes connection tubes 71 at four inner corners and each connection tube 71 has a threaded passage 72 so that the image processing device 73 is fixed to the frame 70 by bolts 74 extending through the image processing device 73 and threadedly connected to the threaded passages 72. The image processing device 73 has a CCD image processing member and is connected to a display device 82 by a cable 81 via an opening 16 defined through the rectangular portion of the inspection device 10. A fixeding block 191 and a quick connection member 193 are respectively connected to the frame 70 by bolts 192 and 194 such that the users may quickly and easily connected with the main shaft 91 of machine 90. A plurality of adjustment bolts 18 extend through holes 17 defined through a wall of the inspection device 10 and contact the frame 70 which is adjusted by the adjustment bolts 18.

Figure 4:
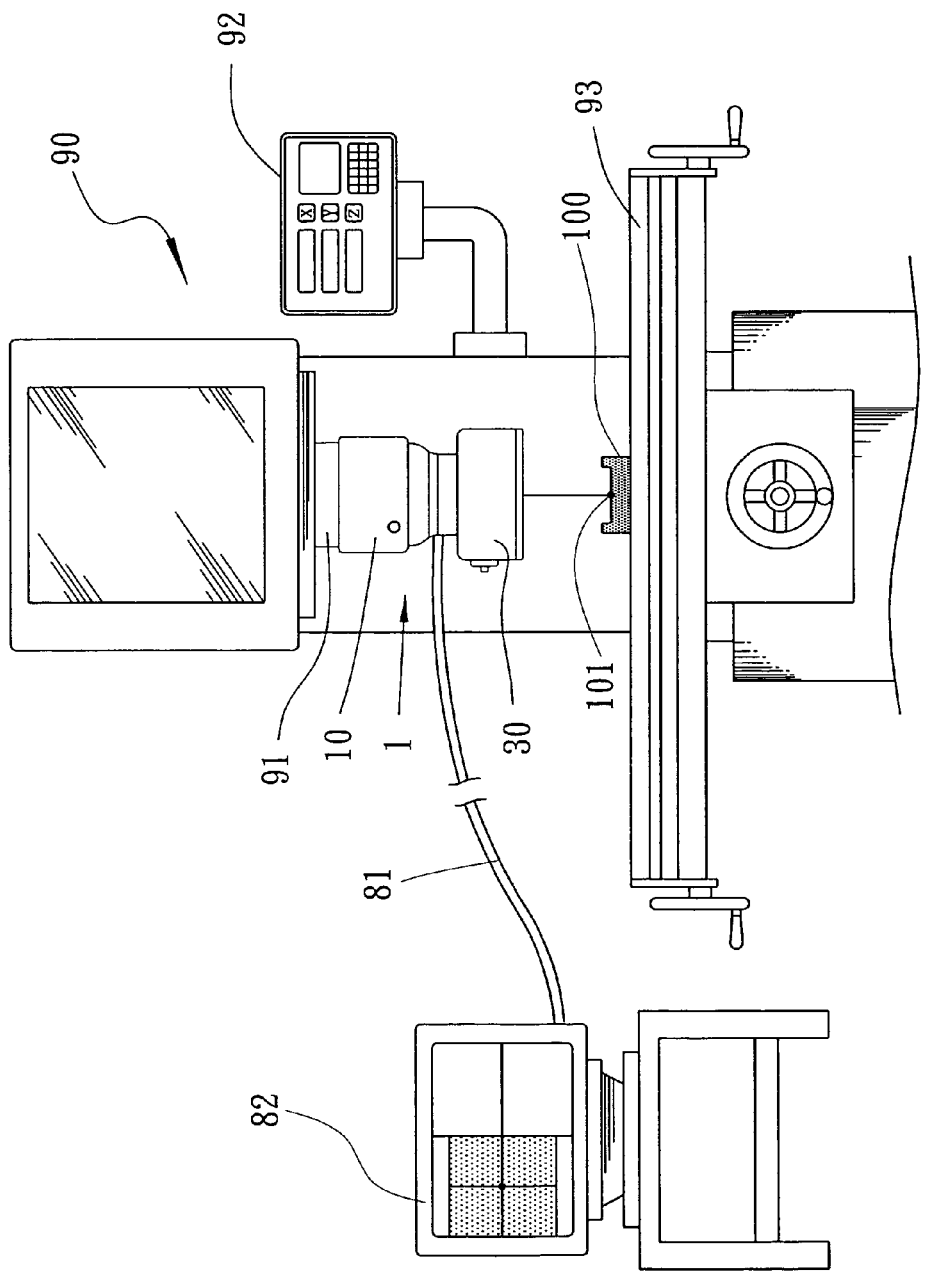
FIG. 4 shows that the laser index device of the present invention is connected to the main shaft and marks the product at a desired area.

Referring to FIGS. 3 and 4, the product 100 does not need to be removed from the workbench 93 and the tool is first removed from the main shaft 91 and the laser index device 1 of the present invention is then connected to the main shaft 91. To activate the laser assembly 50 by pushing the switch 55 and a laser beam is refracted via the prism 22 to mark on the product 100 so that the user knows the distance of the desired area 101 on the product 100. Then the laser assembly 50 is turned off and the CCD image processing member 80 sends the image on the display device 82 so that the measurement can be proceeded on the workbench 93. The machine 90 may also be used to machine the product 100 by reference the digits displayed on the machining display unit 92 which shows the movement of tool. Therefore, the product is machined and measured precisely.

While we have shown and described the embodiment in accordance with the present invention, it should be clear to those skilled in the art that further embodiments may be made without departing from the scope of the present invention.

What is claimed is:

1. A laser index device comprising:

an inspection device adapted to be connected to a main shaft of machine and having a lens unit, an image processing device located above the lens unit;

a positioning device having a fixing ring received therein and a laser assembly connected to the fixing ring, a switch connected to an outside of the positioning device for activating the laser unit which is adapted emits a laser beam on a product, and a display device connected to the image processing device and a machining display unit which is adapted to display movement of tool.

2. The device as claimed in claim 1, wherein the inspection device has a connection neck to which the positioning device is connected, a side hole is defined radially through the connection neck.

3. The device as claimed in claim 1, wherein a frame is received in the positioning device and the image processing device is received in the frame, a fixeing block and a quick connection member are respectively connected to the frame, a cable is connected between the image processing device and the display device, a plurality of adjustment bolts extend through holes defined through a wall of the inspection device and contact the frame which is adjusted by the adjustment bolts.

4. The device as claimed in claim 1, wherein a fixing bolt and an adjusting bolt extend through the fixing ring so as to adjust the fixing ring.

5. The device as claimed in claim 4, wherein the laser assembly includes an isolation sleeve in which a laser generating member is received, and a control collar which is adapted to control the laser beam.

6. The device as claimed in claim 1, wherein an LCD assembly is connected to an underside of the fixing ring and a positioning ring is connected to the positioning device to position the LCD assembly.

* * * * *